UNITED STATES PATENT OFFICE.

MEINHARD HOFFMANN, OF MAINKUR, ASSIGNOR TO LEOPOLD CASSELLA & CO., OF FRANKFORT-ON-THE-MAIN, GERMANY.

BLACK AZO DYE.

SPECIFICATION forming part of Letters Patent No. 533,463, dated February 5, 1895.

Application filed September 12, 1894. Serial No. 522,827. (Specimens.) Patented in England August 14, 1893, No. 15,444, and in France August 21, 1893, No. 232,299.

*To all whom it may concern:*

Be it known that I, MEINHARD HOFFMANN, a citizen of Prussia, and a resident of Mainkur, near Frankfort-on-the-Main, Germany, have invented new and useful Improvements in the Production of Black Azo Dyestuffs, of which the following is a specification.

This invention (for which patents have been obtained in France, No. 232,299, dated August 21, 1893, and in Great Britain, No. 15,444, dated August 14, 1893,) has for its object the production of new black coloring matters which derive from alpha one, alpha two, naphthylenediamin beta three or beta four sulfo acid. These acids may be produced by acetylating the alpha one, naphthylamin beta three or beta four sulfo acids and treating the acetylated products with nitric acid and reducing agents.

The acetylation of the alpha one beta three and alpha one beta four naphthylaminsulfo acid may be carried out successfully by treating the dry sodium salts of the acid during some time with an excess of glacial acetic acid. After the latter has been separated by distillation, the acetylated acids are obtained in a shape directly suitable for technical purposes. The nitration may for instance be carried out as follows: Two hundred and sixty-five kilos of the mixed acetnaphthylaminsulfo-acid are dissolved in thirteen hundred kilos sulfuric acid and while cooling one hundred and sixty kilos of a mixture of nitric and sulfuric acid, containing forty-three per cent. $HNO_3$ are introduced. The mixture is left standing for a short time, then diluted to three thousand liters by adding ice and water. Then the sodium salts of the nitro acids are precipitated by addition of five hundred kilos common salt. These are easily soluble in pure water. The salt of the alpha one beta four acid crystallizes in the shape of needles, that of the alpha one beta three acid in the shape of rhombic tablets. Characteristic of the nitro acids is that they can be easily saponified with mineral acids. The alpha one alpha two nitronaphthylamin beta sulfo acids thus produced dye wool in an acid bath a greenish yellow, similar to naphthol yellow.

The reduction of the nitroacetnaphthylaminsulfo acids is best executed in the following manner: Thirty-one kilos nitro acid are introduced gradually into a boiling mixture of fifty kilos iron shavings, one hundred liters water and three kilos acetic acid fifty per cent. As soon as the liquid loses its color, the dissolved iron is precipitated with soda. Then the liquid is filtered and the alpha one alpha two acetnaphthylenediaminsulfo acid is precipitated from the filtrate by the addition of twenty kilos muriatic acid.

The alpha one, alpha two acetnaphthylamin beta three sulfo-acid as well as the beta four sulfo acid are very difficultly soluble even in warm water. Both crystallize in needles. If treated with nitrous acid, acetamidodiazonaphthalenesulfo acids result. They are of a yellow color, very difficultly soluble in water, and react very easily with amines and phenols. Valuable black poly-azo-dyestuffs are obtained if these diazocompounds are combined with a diazotizable amin, then immediately diazotized again, combined with a phenol, an amin or an amidophenol and finally saponified. The dyestuffs thus obtained correspond to the constitution:

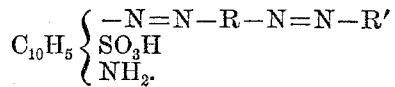

In carrying out my invention I proceed for instance as follows: The diazo compound of 28.2 kilos alpha one, alpha two, amidoacetnaphthalid beta three sulfo acid produced as indicated is combined with alpha naphthylamin. The product is dissolved in five hundred liters water and four kilos caustic soda. Then seven kilos nitrite are added to the solution which is then allowed to run into thirty-six kilos diluted muriatic acid which is kept cold. The diazo compound separates in brown, very difficultly soluble flakes. If the diazo compound is brought into an alkaline solution of twenty-seven kilos beta one, alpha four, amidonaphthol beta three sulfo acid, the formation of dyestuff takes place at once. The difficulty soluble, dark colored precipitate is filtered off and boiled with one thousand liters of ten per cent. soda lye, until the pure blue color of a diluted sample does not change any more under the influence of acetic acid. By neutralizing the liquid the dyestuff precipitates. It dyes wool and cotton a bluish black. Analogous dyestuffs are obtained, if in this example naphthylamin is replaced by either alpha one beta three or alpha one beta four naphthylaminsulfo acid, alpha one beta one amidonaphtholether.

These dyestuffs have a great technical value in consequence of their special property to dye both animal and vegetable fibers with nearly equal affinity and shade. They are therefore suitable for dyeing for instance fabrics composed of wool and cotton.

Having thus described my invention and in what manner it may be performed, what I claim as new, and desire to secure by Letters Patent, is—

1. The process of producing new black azo-dyestuffs by combining the diazo compound of alpha one alpha two naphthylenediamin-beta-sulfo acid with a diazotizable amin, diazotizing again, combining with gamma-amidonaphthol-sulfo acid and saponifying the product substantially as described.

2. The new black dyestuff having the formula:

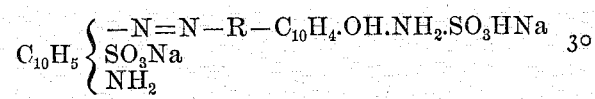

which is a black powder, readily soluble in water with blue black color, insoluble in alcohol, dissolving in concentrated sulfuric acid with a bluish black shade, the latter solution forming a dark blue precipitate by an excess of water and dyeing vegetable and animal fibers bluish black, substantially as described.

In testimony that I claim the foregoing as my invention I have signed my name, in presence of two witnesses, this 30th day of August, 1894.

MEINHARD HOFFMANN.

Witnesses:
ALVESTO S. HOGUE,
JEAN GRUND.